United States Patent
Kaskawitz et al.

(10) Patent No.: US 7,849,665 B2
(45) Date of Patent: Dec. 14, 2010

(54) RECIRCULATING GRASS BAGGING APPARATUSES AND METHODS

(75) Inventors: Scott Kaskawitz, Burlington, NC (US); Vincent Prinzo, Hillsborough, NC (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/409,042

(22) Filed: Mar. 23, 2009

(65) Prior Publication Data

US 2010/0236208 A1    Sep. 23, 2010

(51) Int. Cl.
*A01D 67/00* (2006.01)
(52) U.S. Cl. .................................. 56/320.2; 56/202
(58) Field of Classification Search ............. 56/202, 56/320.2, 13.3, 205, 204, 16.6; 15/347, 346, 15/340.1; 55/385.1
See application file for complete search history.

(56) References Cited

U.S. PATENT DOCUMENTS

| | | | | |
|---|---|---|---|---|
| 3,517,493 A | * | 6/1970 | Kiteley | 56/194 |
| 4,631,909 A | | 12/1986 | McLane | |
| 4,848,070 A | | 7/1989 | Berglund | |
| 4,924,664 A | * | 5/1990 | Hicks et al. | 56/202 |
| 5,010,716 A | * | 4/1991 | Fassauer | 56/12.1 |
| 5,036,650 A | * | 8/1991 | Tesch et al. | 56/16.6 |
| 5,113,642 A | * | 5/1992 | Dunn | 56/12.8 |
| 5,224,326 A | * | 7/1993 | Dunn | 56/12.8 |
| 5,317,860 A | * | 6/1994 | Dunn | 56/12.8 |
| 5,447,020 A | | 9/1995 | Dunn | |
| 5,678,399 A | * | 10/1997 | Baron | 56/320.2 |
| 6,089,006 A | * | 7/2000 | Langford et al. | 56/202 |
| 6,105,350 A | * | 8/2000 | Vachon et al. | 56/202 |
| 6,705,068 B2 | | 3/2004 | Iida et al. | |
| 7,194,850 B2 | * | 3/2007 | Asahara et al. | 56/202 |
| 7,272,920 B2 | * | 9/2007 | Wright et al. | 56/202 |
| 7,329,297 B2 | * | 2/2008 | Dunning et al. | 55/385.1 |
| 7,343,727 B2 | | 3/2008 | Iida et al. | |
| 7,354,466 B2 | * | 4/2008 | Dunning et al. | 55/385.1 |
| 7,677,019 B2 | * | 3/2010 | Iida et al. | 56/12.2 |
| 2003/0066280 A1 | * | 4/2003 | Iida et al. | 56/167 |
| 2005/0284121 A1 | * | 12/2005 | Iida et al. | 56/202 |
| 2008/0028736 A1 | | 2/2008 | Iida et al. | |
| 2009/0229234 A1 | * | 9/2009 | Ettrich | 56/13.1 |

FOREIGN PATENT DOCUMENTS

| | | |
|---|---|---|
| EP | 0 610 062 A1 | 2/1994 |
| EP | 0 745 316 A1 | 5/1996 |
| WO | WO 2007009627 A1 * | 1/2007 |

OTHER PUBLICATIONS

European Office Action/Communication dated Jul. 22, 2010 for Application No. 10153798.3-2313.

* cited by examiner

*Primary Examiner*—Árpád Fábián-Kovács
(74) *Attorney, Agent, or Firm*—Jenkins, Wilson, Taylor & Hunt, P.A.

(57) ABSTRACT

Apparatuses and methods for separating grass clippings from air in a recirculating bagging apparatus for a lawnmower can include a grass-collecting compartment for collecting grass clippings discharged from a lawnmower and an air discharge channel in communication with and disposed below the grass-collecting compartment. The grass-collecting compartment can have a non-breathable bottom floor for receiving and supporting collected grass clippings. The air discharge channel can be adapted for passage of air discharged from a lawnmower through the grass-collecting compartment and out of the bagging apparatus.

19 Claims, 4 Drawing Sheets

US 7,849,665 B2

RECIRCULATING GRASS BAGGING APPARATUSES AND METHODS

TECHNICAL FIELD

The subject matter disclosed herein relates generally to grass bagging systems for lawnmowers. More particularly, the subject matter disclosed herein relates to grass bagging apparatuses and methods that reduce the amount of dust a lawnmower operator experiences while mowing.

BACKGROUND

It is common to attach a grass catcher (i.e., a bag) to a push-behind or riding lawnmower to collect the grass clippings produced. Using a grass catcher in this way is considered advantageous in some respects because it removes grass clippings, leaves, or other solid materials, giving the lawn a clean appearance without requiring any raking or other follow-up maintenance. In addition, the clippings can be easily collected in this way for composting.

In typical bagging systems, the grass catcher can have rearwardly positioned vents or mesh to retain solids such as grass clippings, twigs, and leaves within the grass catcher but allow the flow of air in which the solids are entrained to pass through the grass catcher. In dry climates or during dry seasons, however, mowing can create a great deal of dust. In such situations, these dust particles are capable of filtering through the mesh and venting towards or near the operator, which can be unpleasant for the operator of the mower and potentially harmful to the mower's engine.

Some bagging systems have been developed to automatically separate solids entrained in the air flow passing through the grass catcher without discharging the air flow to the atmosphere. These systems include closed looped vacuum systems and various fabric weaves that knock down the debris. Generally, however, these systems only marginally reduce the amount of dust that a lawnmower operator experiences while mowing. Accordingly, there still exists a need for a grass bagging system for a lawnmower that further reduces the amount of dust the lawnmower operator experiences while mowing.

SUMMARY

In accordance with this disclosure, recirculating bagging apparatuses for a lawnmower and related methods are provided. In one aspect, a recirculating bagging apparatus can be provided including a grass-collecting compartment having a non-breathable bottom floor and an air discharge channel in communication with and disposed below the grass-collecting compartment. Such a bagging apparatus can be used to collect grass clippings discharged from a lawnmower in the grass-collecting compartment, while air discharged from a lawnmower can be passed through the grass-collecting compartment, to the air discharge channel, and out of the bagging apparatus.

In another aspect, a recirculating bagging apparatus can likewise be provided including a grass-collecting compartment for collecting grass clippings discharged from a lawnmower, a non-breathable cover layer substantially surrounding the grass-collecting compartment, an air discharge channel in communication with and disposed below the grass-collecting compartment, and a breathable inner layer separating the grass-collecting compartment from the air discharge channel. The grass-collecting compartment can have a non-breathable bottom floor for receiving and supporting collected grass clippings and a grass inlet providing access to the grass-collecting compartment. The air discharge channel can be adapted for passage of air discharged from a lawnmower through the breathable inner layer of the grass-collecting compartment and out of the bagging apparatus. In this arrangement, air discharged through the grass-collecting compartment can pass through the breathable inner layer to the air discharge channel, but grass clippings and other solids received cannot pass to the air discharge channel.

In yet another aspect, a method for separating grass clippings from air in a recirculating bagging apparatus for a lawnmower can be provided. The method can include collecting grass clippings discharged from a lawnmower in a grass-collecting compartment, and passing air discharged from a lawnmower through the grass-collecting compartment, to an air discharge channel in communication with and disposed below the grass-collecting compartment, and out of the bagging apparatus. Further, the grass-collecting compartment can have a non-breathable bottom floor for receiving and supporting collected grass clippings.

Some of the aspects of the subject matter disclosed herein having been stated hereinabove, and which are achieved in whole or in part by the presently disclosed subject matter, other aspects will become evident as the description proceeds when taken in connection with the accompanying drawings as best described hereinbelow

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

Figure 1A:
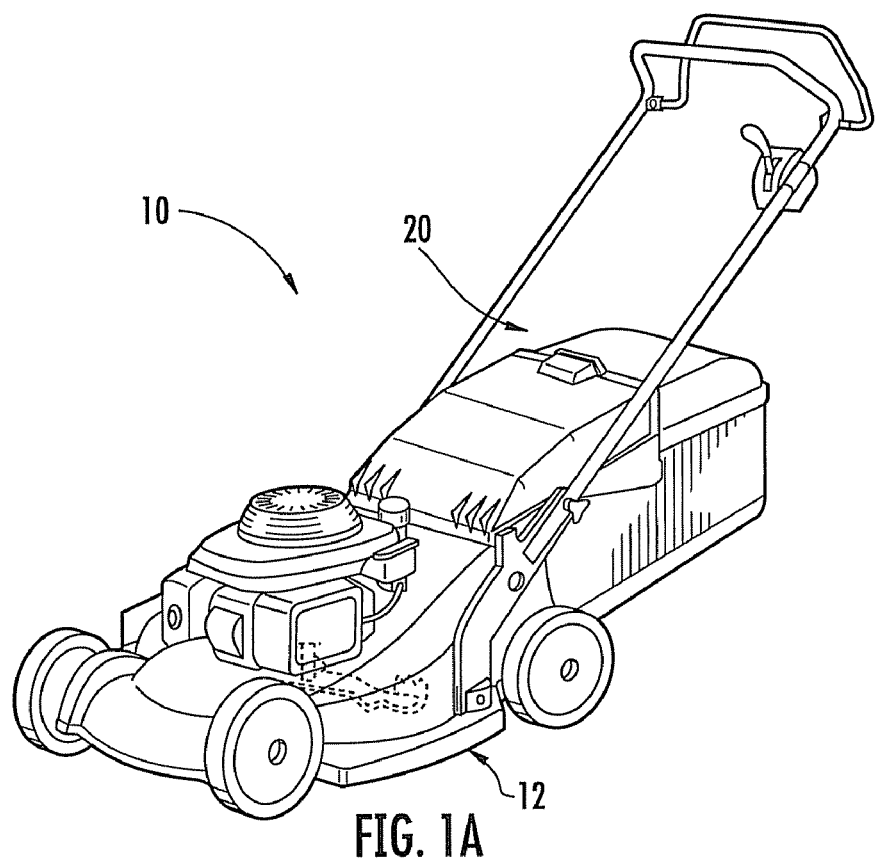
FIG. 1A is a perspective view of a lawnmower including a grass bagging system according to an embodiment of the presently disclosed subject matter.
Figure 1B:
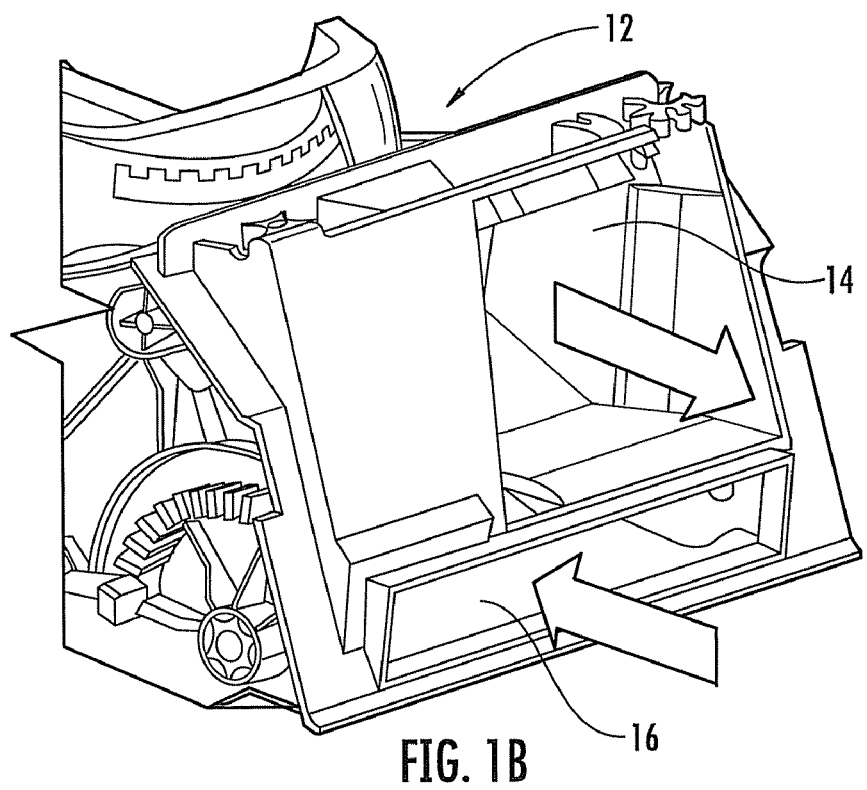
FIG. 1B is a perspective view of a discharge outlet and air recirculation inlet of a lawnmower for use with the grass bagging system according to an embodiment of the presently disclosed subject matter.

The present subject matter can in one aspect provide a recirculating bagging apparatus such as, for example, recirculating bagging apparatus generally designated 20 in FIG. 1A. Recirculating bagging apparatus 20 is shown in association with a walk-behind lawnmower generally designated 10 but can be used in association with a riding lawnmower or any other suitable power equipment. Lawnmower 10 can include a mower blade housing generally designated 12 from which airflow, including entrained grass clippings and dust, can be discharged through a discharge outlet 14, shown in FIG. 1B. Recirculating bagging apparatus 20 can receive discharged airflow, grass clippings and other solid materials (e.g., leaves, twigs), and dust-laden air can be passed back to an air recirculation inlet designated by direction arrow 16 (shown in FIG. 1B) of mower blade housing 12. As a result, the amount of dust can be greatly reduced if not eliminated entirely from the operator zone.

Referring to FIGS. 2A, 2B, and 3A through 3C, bagging apparatus 20 can include a grass-collecting compartment generally designated 30 and a grass inlet designated by direction arrow 22 for communication with discharge outlet 14 of mower blade housing 12 and for providing access to grass-collecting compartment 30. Bagging apparatus 20 can further include an air discharge channel designated by direction arrow 40 that can be in communication with and disposed below grass-collecting compartment 30. Air discharge channel 40 can provide an air outlet designated by direction arrow 42 for communication with air recirculation inlet 16 of mower blade housing 12. In this arrangement, the air discharged from mower blade housing 12 can be routed through grass-collecting compartment 30 and air discharge channel 40 before exiting out of bagging apparatus 20 and returning to mower blade housing 12.

As is shown in FIGS. 2A, 2B, and 3A through 3C, grass-collecting compartment 30 can include a bottom floor 32 for receiving and supporting collected grass clippings. Bottom floor 32 can be formed of a non-breathable material such that grass clippings collected in grass-collecting compartment 30 cannot pass through bottom floor 32. For instance, bottom floor 32 can be a vacuum-formed plastic plate. Alternatively, bottom floor 32 can be a two-piece vacuum-formed air tunnel. Regardless of the specific form, bottom floor 32 can help define the separation between grass-collecting compartment 30 and air discharge channel 40 and thus help to control the flow of air through bagging apparatus 20.

In addition, bagging apparatus 20 can include a cover layer 34 shown in FIGS. 2A, 2B and 3A through 3C, which can be positioned about grass-collecting compartment 30. In particular, cover layer 34 can define side, top, and back walls that substantially surround grass-collecting compartment 30 as shown in the drawings. Cover layer 34 can comprise a non-breathable material (e.g., such as a tightly-woven cloth or a plastic bag), which can at least substantially block the flow of air through cover layer 34. As a result, cover layer 34 being made of a non-breathable material can restrict the available flow paths in bagging apparatus 20. As such, cover layer 34 can further help to direct the flow of air in the desired path (i.e., toward air discharge channel 40), which in turn can help prevent dust from being vented toward an operator of lawnmower 10. Specifically, recirculating the dust-laden air below grass-collecting compartment 30 and returning it towards a bottom portion of mower blade housing 12 (e.g., through air recirculation inlet 16) can advantageously reduce the amount of dust experienced in the operator zone.

Figure 2A:
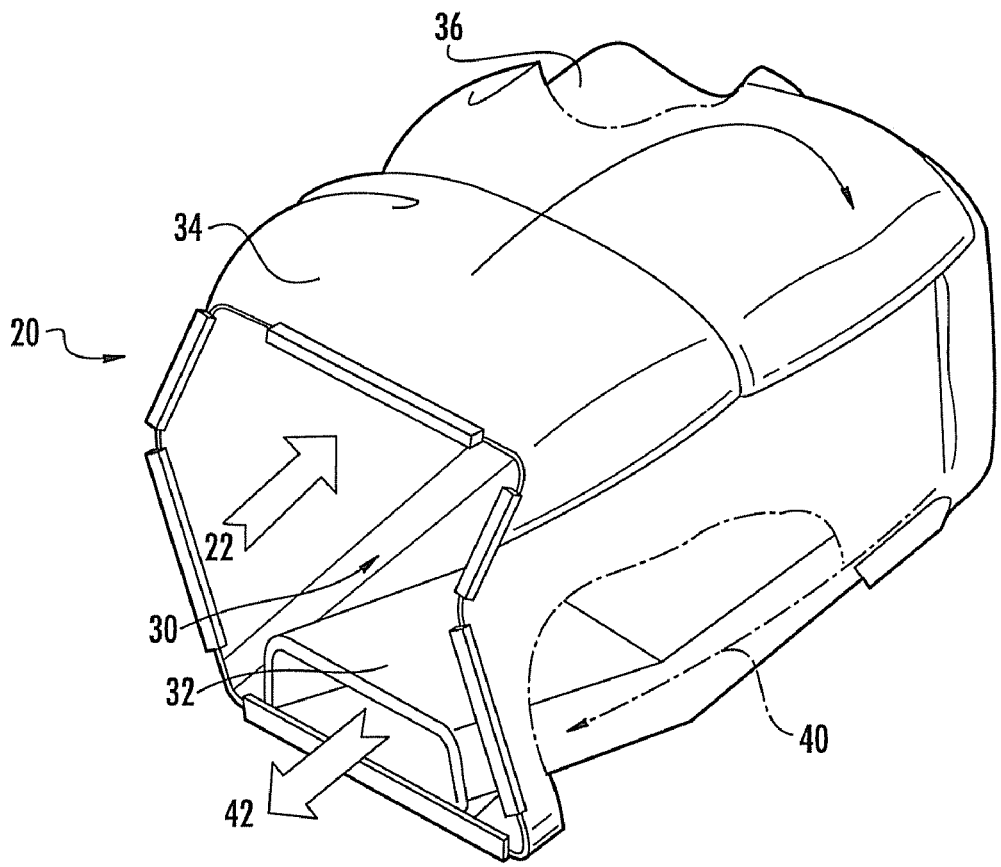
FIG. 2A is a perspective view of a grass bagging system according to an embodiment of the presently disclosed subject matter.
Figure 2B:
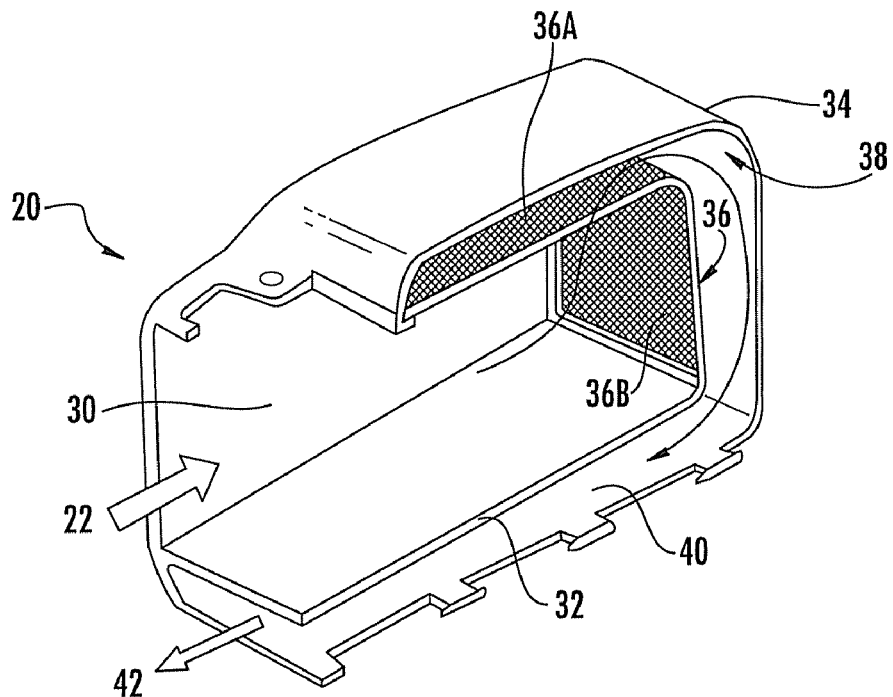
FIG. 2B is a partial cutaway view of the grass bagging system according to the embodiment shown in FIG. 2A.

Further, bagging apparatus 20 can include an inner layer 36 positioned between grass inlet 22 and air discharge channel 40 as shown in FIGS. 2A and 2B. Specifically, inner layer 36 can be positioned about grass-collecting compartment 30 inside of cover layer 34. A gap 38 can be formed between inner layer 36 and cover layer 34 to allow airflow between these layers to air discharge channel 40. Inner layer 36 can comprise a breathable barrier such that air discharged through grass-collecting compartment 30 can pass through the breathable barrier to air discharge channel 40, but grass clippings and other solids cannot pass to air discharge channel 40 and thus are retained in grass-collecting compartment 30. The breathable barrier can be formed from any of a variety of air-permeable materials, such as a fabric mesh or a plastic screen. No matter what material is used to form the breathable barrier, inner layer 36 can serve essentially to filter the airflow through bagging apparatus 20 and thus prevent grass clippings or other solid materials from entering air discharge channel 40 and returning to mower blade housing 12.

In one configuration shown in FIGS. 2A and 2B, inner layer 36 can include a top portion 36A and a back portion 36B. In this configuration, inner layer 36 can be secured at or near an end of bottom plate 32 and to sides of cover layer 34. In this way, airflow can pass through inner layer 36 at either the top or back of grass-collecting compartment 30. In one more particular embodiment shown in FIG. 2B, bagging apparatus 20 can be a multi-piece plastic grass bag, where cover layer 34 can be a two-sided "clamshell" (one half shown in FIG. 2B), and inner layer 36 can be a slide-in plastic screen.

Figure 3A:
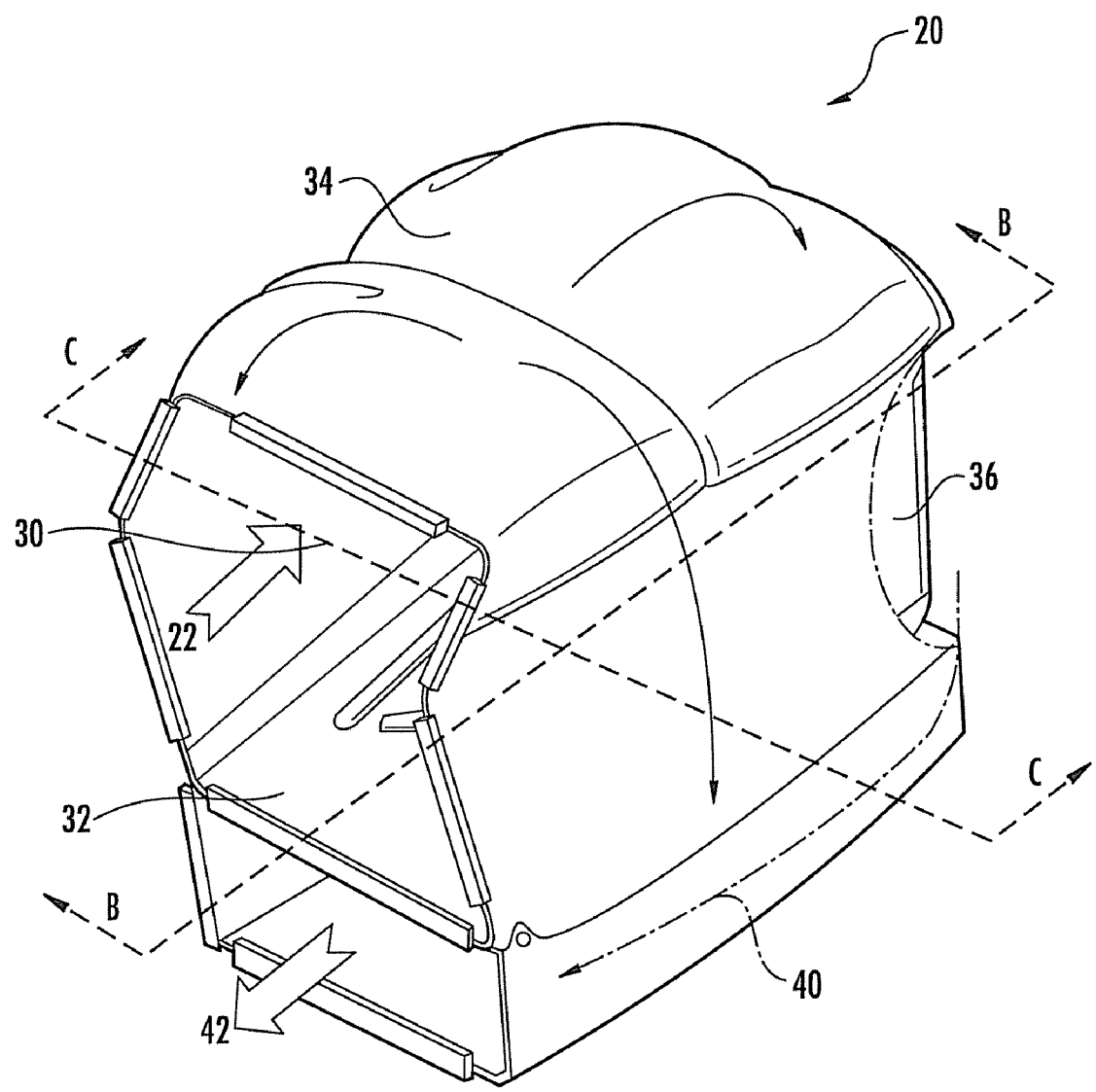
FIG. 3A is a perspective view of a grass bagging system according to an embodiment of the presently disclosed subject matter.
Figure 3B:
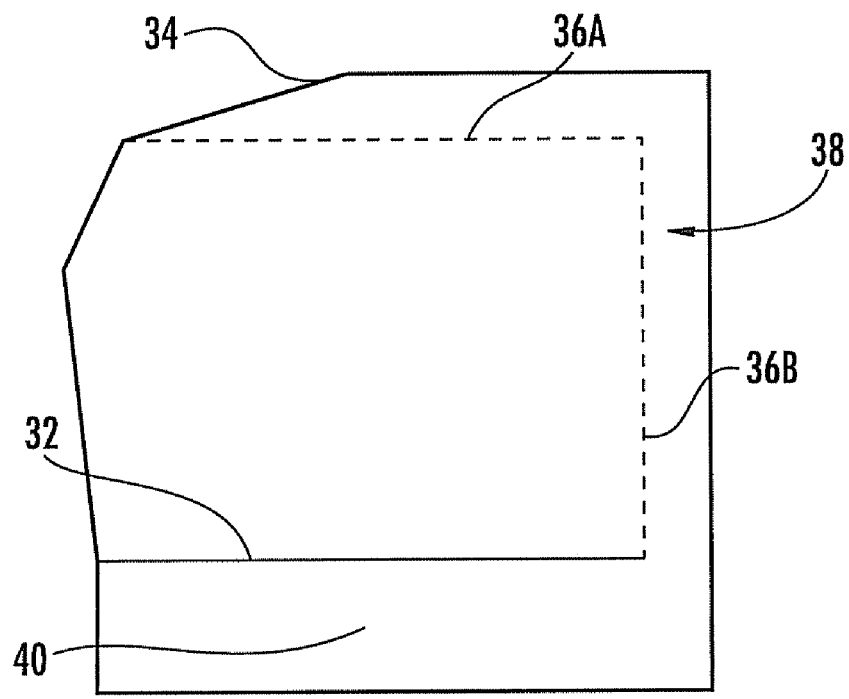
FIGS. 3B and 3C are sectional views of the grass bagging system according to the embodiment shown in FIG. 3A.
Figure 3C:
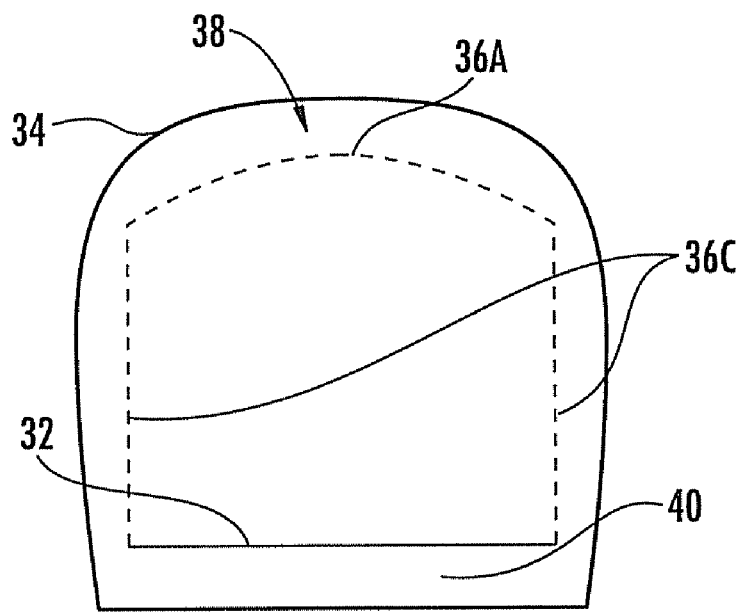

Alternatively, in another configuration shown in FIGS. 3A through 3C, inner layer 36 can include two side portions 36C in addition to the top and back portions 36A and 36B. Specifically, FIG. 3B illustrates a sectional view of bagging apparatus 20 taken along line B-B of FIG. 3A, in which top portion 36A and back portion 36B can be seen. Similarly, FIG. 3C illustrates a sectional view of bagging apparatus 20 taken along line C-C of FIG. 3A, in which top portion 36A and side portions 36C can be seen. In this configuration, inner layer 36 can be secured at or near both sides and an end of bottom floor 32. In this way, airflow can pass through inner layer 36 at the top, the back, or the sides of grass-collecting compartment 30 to be recirculated through air discharge channel 40 back to air recirculation inlet 16 of mower blade housing 12.

In another aspect, the presently disclosed subject matter provides a method for separating grass clippings from air in a recirculating bagging apparatus 20 for a lawnmower. This method can include collecting grass clippings discharged from a lawnmower in a grass-collecting compartment 30, grass-collecting compartment 30 having a non-breathable bottom floor 32 for receiving and supporting collected grass clippings. The method can further include passing air discharged from a lawnmower through grass-collecting compartment 30, to an air discharge channel 40 in communication with and disposed below grass-collecting compartment 30, and out of bagging apparatus 20. In addition, the method can also include filtering the air discharged from a lawnmower before passing the air to air discharge channel 40. This filtering can be accomplished by passing the air through a breathable inner layer 36, such as an air-permeable fabric or plastic screen noted above. Other methods are also possible in accordance with use of the embodiments described above.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A recirculating bagging apparatus for a lawnmower comprising:

a grass-collecting compartment for collecting grass clippings discharged from a lawnmower, the grass-collecting compartment having a non-breathable bottom floor for receiving and supporting collected grass clippings and an inner layer comprising a back portion that defines a back section of the grass-collecting compartment and a top portion that defines a top section of the grass-collecting compartment, the inner layer comprising a breathable barrier, the grass-collecting compartment communicating with an airflow path exiting the grass-collecting compartment; and an air discharge channel in communication with the airflow path exiting the grass-collecting compartment and disposed below the grass-collecting compartment, the air discharge channel adapted for passage of air discharged from the lawnmower through the grass-collecting compartment and out of the bagging apparatus;

wherein air discharged through the grass-collecting compartment can pass through the breathable barrier to the air discharge channel, but grass clippings collected by the grass-collecting compartment are prevented from passing to the air discharge channel.

2. The apparatus of claim 1, wherein the grass-collecting compartment comprises a grass inlet for communication with a discharge outlet of the lawnmower.

3. The apparatus of claim 1, wherein the air discharge channel comprises an air outlet for communication with an area under a housing of the lawnmower such that air passed through the grass-collecting compartment and out of the bagging apparatus is passed to the area under the housing.

4. The apparatus of claim 1, further comprising a cover layer comprising a non-breathable material substantially surrounding the grass-collecting compartment.

5. The apparatus of claim 1, wherein the inner layer further comprises two side portions that define side sections of the grass-collecting compartment.

6. The apparatus of claim 1, wherein the breathable barrier comprises an air-permeable fabric.

7. The apparatus of claim 1, wherein the breathable barrier comprises an air-permeable plastic screen.

8. The apparatus of claim 4, wherein air discharged through the grass-collecting compartment passes to the air discharge channel through a gap formed between the breathable barrier and the cover layer.

9. A recirculating bagging apparatus for a lawnmower comprising:

a grass-collecting compartment for collecting grass clippings discharged from a lawnmower, the grass-collecting compartment having a non-breathable bottom floor for receiving and supporting collected grass clippings, a breathable inner layer comprising a back portion that defines a back section of the grass-collecting compartment and a top portion that defines a top section of the grass-collecting compartment, and a grass inlet providing access to the grass-collecting compartment;

a non-breathable cover layer substantially surrounding the grass-collecting compartment; and an air discharge channel in communication with and disposed below the grass-collecting compartment, the air discharge channel being separated from the grass-collecting compartment by the breathable inner layer, the air discharge channel configured for passage of air discharged from the lawnmower through the grass-collecting compartment and out of the bagging apparatus;

wherein air discharged through the grass-collecting compartment can pass through the breathable inner layer to the air discharge channel, but grass clippings and other solids received are prevented from passing to the air discharge channel.

10. The apparatus of claim 9, wherein the grass inlet is adapted for communication with a discharge outlet of the lawnmower, and the air discharge channel comprises an air inlet for communication with a recirculation inlet of the lawnmower, the discharge outlet being oriented in a direction substantially opposing the recirculation inlet.

11. The apparatus of claim 9, wherein the air discharge channel comprises an air outlet for communication with an area under a housing of the lawnmower such that air passed through the grass-collecting compartment and out of the bagging apparatus is passed to the area under the housing.

12. The apparatus of claim 9, wherein the inner layer further comprises two side portions that define side sections of the grass-collecting compartment.

13. The apparatus of claim 9, wherein the grass-collecting compartment is in communication with an airflow path exiting the grass-collecting compartment and communicating with the air discharge channel.

14. A method for collecting grass clippings discharged from a lawnmower, comprising:

discharging cut grass clippings from a lawnmower;

collecting the grass clippings discharged from the lawnmower in a grass-collecting compartment, the grass-collecting compartment having a non-breathable bottom floor that receives and supports collected grass clippings and a breathable inner layer comprising a back portion that defines a back section of the grass-collecting compartment and a top portion that defines a top section of the grass-collecting compartment; and passing air discharged from the lawnmower through the grass-collecting compartment, to an air discharge channel in communication with and disposed below the grass-collecting compartment, and out of the bagging apparatus.

15. The method of claim 14, wherein passing air out of the bagging apparatus comprises passing the air to an area under a housing of the lawnmower.

16. The method of claim 14, further comprising preventing grass clippings from passing to the air discharge channel.

17. The method of claim 16, wherein preventing grass clippings from passing to the air discharge channel comprises passing the air discharged from the lawnmower through the breathable inner layer.

18. The method of claim 17, wherein passing air to an air discharge channel comprises passing air through a gap formed between the breathable inner layer and a non-breathable cover layer substantially surrounding the grass-collecting compartment.

19. The method of claim 14, wherein passing air from the lawnmower comprises passing air along an airflow path from the grass-collecting compartment.

* * * * *